United States Patent
Liu et al.

(10) Patent No.: US 11,347,842 B2
(45) Date of Patent: May 31, 2022

(54) SYSTEMS AND METHODS FOR PROTECTING A REMOTELY HOSTED APPLICATION FROM MALICIOUS ATTACKS

(71) Applicant: Citrix Systems, Inc., Fort Lauderdale, FL (US)

(72) Inventors: Zhipan Liu, Nanjing Jiangsu (CN); Ke Xu, Nanjing Jiangsu (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 495 days.

(21) Appl. No.: 16/348,583

(22) PCT Filed: Apr. 3, 2019

(86) PCT No.: PCT/CN2019/081272
§ 371 (c)(1),
(2) Date: May 9, 2019

(87) PCT Pub. No.: WO2020/199163
PCT Pub. Date: Oct. 8, 2020

(65) Prior Publication Data
US 2021/0365548 A1 Nov. 25, 2021

(51) Int. Cl.
*G06F 21/00* (2013.01)
*G06F 21/55* (2013.01)
*G06F 21/31* (2013.01)

(52) U.S. Cl.
CPC .......... *G06F 21/552* (2013.01); *G06F 21/316* (2013.01); *G06F 2221/033* (2013.01)

(58) Field of Classification Search
CPC . G06F 21/316; G06F 21/552; G06F 2221/033
See application file for complete search history.

(56) References Cited

U.S. PATENT DOCUMENTS

| 10,601,654 | B2 * | 3/2020 | Srinivas | H04L 43/04 |
| 2013/0042306 | A1 | 2/2013 | Hou et al. | |
| 2018/0027006 | A1 * | 1/2018 | Zimmermann | H04L 63/0245 726/11 |
| 2019/0132230 | A1 * | 5/2019 | Chandrasekaran | H04L 47/11 |

FOREIGN PATENT DOCUMENTS

| CN | 103533546 | 1/2014 |
| CN | 104994092 | 10/2015 |

* cited by examiner

*Primary Examiner* — Ghazal B Shehni
(74) *Attorney, Agent, or Firm* — BainwoodHuang

(57) ABSTRACT

User input is collected that is received by a client device, where the client device provides access to a remotely hosted application. The client device analyzes the collected user input received by the client device in order to detect collected user input indicative of machine behavior that simulates inputs provided by a user. The client device prevents subsequent access to the hosted application through the client device in response to detection of collected user input received by the client device indicative of machine behavior that simulates inputs provided by a user, in order to protect the remotely hosted application from malicious attacks.

14 Claims, 7 Drawing Sheets

SYSTEMS AND METHODS FOR PROTECTING A REMOTELY HOSTED APPLICATION FROM MALICIOUS ATTACKS

TECHNICAL FIELD

The present disclosure relates generally to systems and methods for securely providing a hosted application to a user of a client device, and more specifically to improved technology for protecting remotely hosted applications from malicious attacks on a client device.

BACKGROUND

In computer technology, application software may be hosted on a server computer and made accessible to users through client devices. A client device through which users access a hosted application may be remotely located with regard to the server computer. The client device may communicate with the hosted application over one or more computer networks.

SUMMARY

Previous technologies for providing access to a hosted application executing on a server computer through a client device have had significant shortcomings with regard to the security provided at the client device. User input to the client device typically includes or consists of mouse and/or keyboard inputs that are provided by a human user. During a cyberattack, a machine executing malware may simulate inputs provided by a human user at the client device, in order to gain unauthorized access to and/or compromise the legitimate operation of the remotely hosted application, e.g. to access confidential data maintained by the remotely hosted application. For example, after having gained unauthorized access to the hosted application, malware executing on the client device or elsewhere may pass mouse and/or keyboard inputs that are automatically generated by the malware to the client device and/or to one or more client components executing on the client device while accessing or attempting to access confidential data maintained by the remotely hosted application, and/or while otherwise interfering with the legitimate operation of the remotely hosted application through the client device. In another example, malware executing on the client device or elsewhere may pass mouse and/or keyboard inputs that are automatically generated by the malware to the client device and/or to one or more components executing in the client device as part of a brute-force password attack, in which the malware tries different random passwords in an attempt to guess the password of an authorized user on the client device. In another example, malware executing on the client device or elsewhere may pass mouse and/or keyboard inputs that are automatically generated by the malware to the client device and/or to one or more client components executing on the client device as part of a dictionary attack, in which the malware uses a dictionary of common passwords in an attempt to access the hosted application through the client device.

Because previous client devices providing access to a host application have lacked the ability to detect user input that was automatically generated by malware based on analysis of the user input received by the client device, previous client devices have been substantially ineffective in detecting cyberattacks before the malware-generated user input was forwarded over one or more networks to the remotely hosted application. Previous client devices have accordingly exposed the remotely hosted application to the malware-generated user inputs of cyberattacks made on or through the client device, required that the remotely hosted application use resources on the server computer to detect such attacks, and allowed intermediary networks between the client device and the server to be burdened with network traffic carrying the malware-generated user input until an attack is eventually detected by the remotely hosted application.

It would accordingly be desirable to have new technology that protects a remotely hosted application at a client device by effectively detecting when user input received by the client device was generated by malware, in order to protect the hosted application from cyberattacks performed on or through the client device.

To address the above described and other shortcomings of previous technologies, new technology is described herein that collects user input received by a client device, where the client device provides access to a remotely hosted application. The client device analyzes the collected user input received by the client device in order to detect collected user input that is indicative of machine behavior that simulates inputs provided by a user. The client device prevents subsequent access to the hosted application through the client device in response to detection of collected user input received by the client device indicative of machine behavior that simulates inputs provided by a user, in order to protect the remotely hosted application from malicious attacks, e.g. attempts by malware to gain unauthorized access to and/or compromise the legitimate operation of the remotely hosted application through the client device.

In some embodiments, further in response to detection of collected user input received by the client device indicative of machine behavior that simulates inputs provided by a user, and before preventing subsequent access to the remotely hosted application through the client device, the client device may display at least one verification query in a user interface of the client device. The client device may further receive at least one answer to the verification query. The client device may further analyze the answer received to the verification query to determine whether the answer indicates that the user input received by the client device is being provided by a user.

In some embodiments, the client device may prevent subsequent access to the remotely hosted application through the client device only in response to both i) detection of collected user input received by the client device indicative of machine behavior that simulates inputs provided by a user, and ii) determining that the answer received to the verification query indicates that the user input received by the client device is not being provided by a user.

In some embodiments, the client device may, in response to both i) detection of collected user input received by the client device indicative of machine behavior that simulates inputs provided by a user, and ii) determining that the answer to the verification query indicates that the user input to the client device is being provided by a user, modify a training dataset to generate a training dataset that indicates that the collected user input received by the client device does not reflect machine behavior.

In some embodiments, the client device accesses the remotely hosted application using a client component executing on the client device. In such embodiments, the client device may pass the modified training dataset from the client device to an offline model training process. The offline model training process may generate an updated version of a plug-in based on the modified training dataset, and then automatically replace a version of the plug-in that was previously installed in the client component executing in the client device with the updated version of the plug-in.

In some embodiments, the remotely hosted application may execute on a first server computer, and the offline model training process may execute on a second server computer.

In some embodiments, the client component executing on the client device and used by the client device to access the remotely hosted application may consist of or include a Web browser.

In some embodiments, the user input received by the client device may be received by the client component executing on the client device, and the plug-in installed in the client component executing on the client device may periodically collect the user input received by the client component.

In some embodiments, the plug-in installed in the client component executing on the client device periodically collects user input received by the client component prior to processing of the user input by the client component.

In some embodiments, the plug-in installed in the client component executing on the client device periodically collects user input received by the client component subsequent to processing of the user input and prior to transmission of the user input received by the client component from the client device to the remotely hosted application.

In some embodiments, the user input received by the client component executing on the client device and collected by the plug-in installed in the client component includes computer mouse input.

In some embodiments, the user input received by the client component executing on the client device and collected by the plug-in installed in the client component executing on the client device further includes computer keyboard input.

In some embodiments, the plug-in installed in the client component executing on the client device analyzes the collected user input received by the client component, and prevents subsequent access to the hosted application through the client component in response to detection of collected user input received by the client component indicative of machine behavior that simulates inputs provided by a user by suspending execution of the client component on the client device.

In some embodiments, the client device provides the user with access to a remotely hosted application that consists of or includes a virtual desktop.

In some embodiments, the client device provides the user with access to a remotely hosted application that consists of or includes an individual application.

Embodiments of the technology described herein may provide significant improvements over previous solutions. For example, by preventing subsequent access to a remotely hosted application after detection of collected user input indicative of machine behavior that simulates inputs provided by a user, embodiments of the technology described herein may advantageously i) provide protection for the remotely hosted application against malware directed at the remotely hosted application at or through the client device, ii) remove the burden of detecting malware attacking the client device from the remotely hosted application, and iii) avoid wasting network bandwidth that would otherwise be used if malware-generated user input were forwarded from the client device to the remotely hosted application.

BRIEF DESCRIPTION OF THE DRAWINGS

The foregoing and other objects, features and advantages will be apparent from the following description of particular embodiments, as illustrated in the accompanying drawings in which like reference characters refer to the same parts throughout the different figures. The elements of the drawings are not necessarily drawn to scale, emphasis instead being placed upon illustrating the principles of the various embodiments.

DETAILED DESCRIPTION

Embodiments will now be described with reference to the figures. Such embodiments are provided only by way of example and for purposes of illustration. The scope of the claims is not limited to the examples of specific embodiments shown in the figures and/or otherwise described herein.

The individual features of the particular embodiments, examples, and implementations described herein can be combined in any manner that makes technological sense. Such features are hereby combined to form all possible combinations, permutations and/or variations except to the extent that such combinations, permutations and/or variations have been expressly excluded herein and/or are technically impractical. Support for all such combinations, permutations and/or variations is considered to exist in this document.

Figure 1:
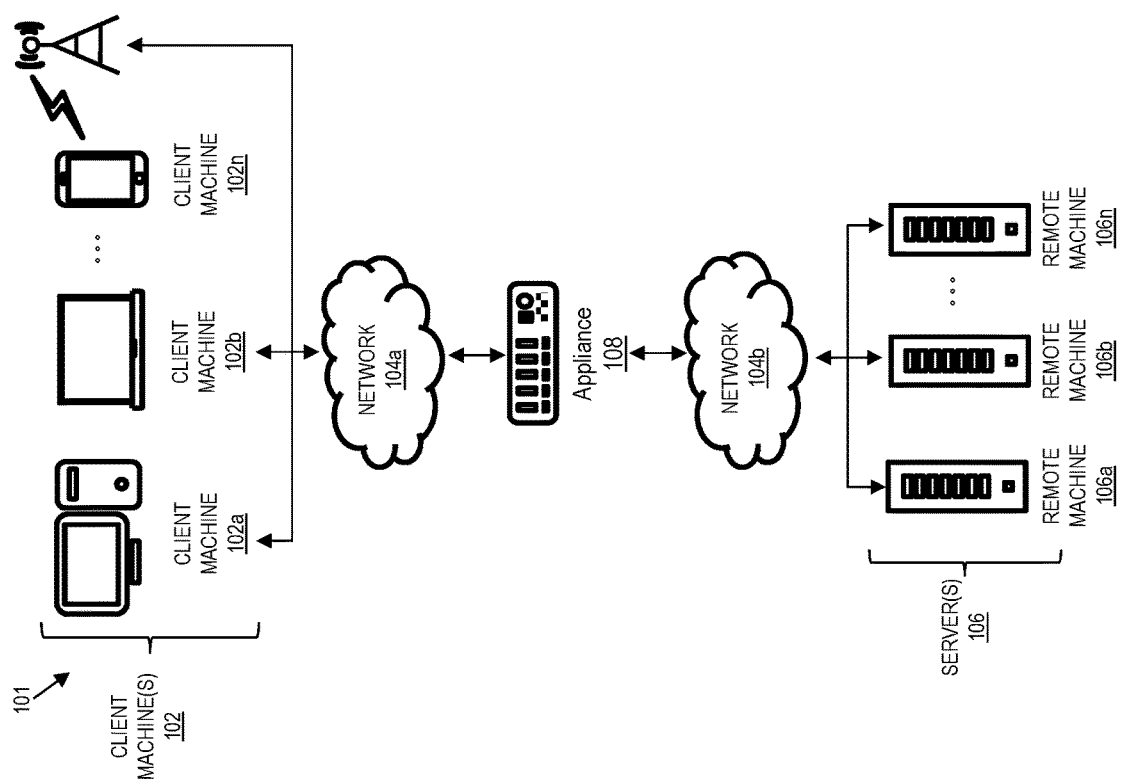
FIG. 1 is a block diagram showing a non-limiting network environment in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106, server computers 106, or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
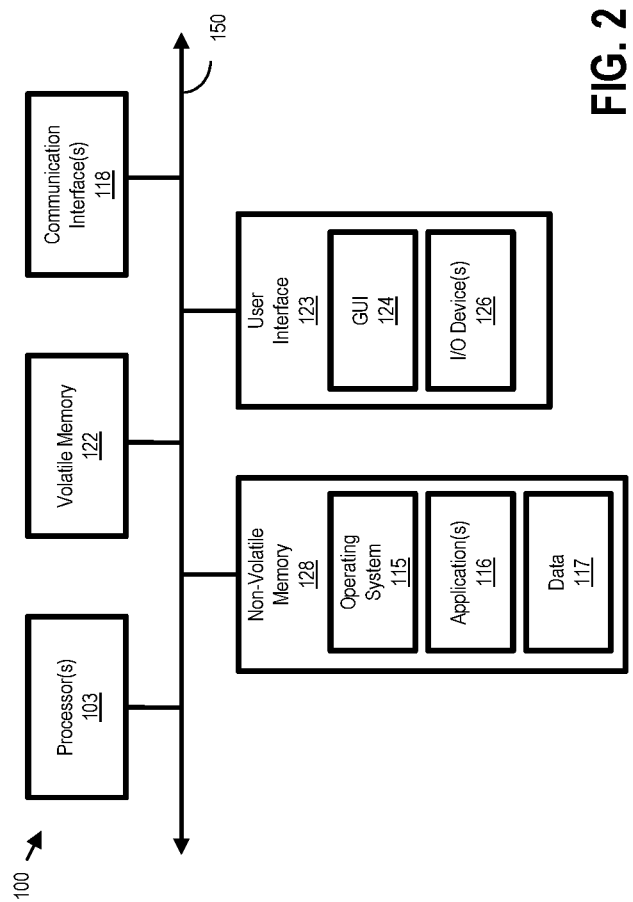
FIG. 2 is a block diagram of a computing device useful for practicing an embodiment of a client device, an appliance, and/or a server.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

As described herein, in order to protect a remotely hosted application from cyberattacks performed through a client device that provides a user of the client device with access to the remotely hosted application, user input that is received by the client device is collected by the client device. The collected user input received by the client device is analyzed by the client device in order to detect whether the collected user input indicates machine behavior that simulates inputs provided by a user (e.g., a human user of the client device). The client device prevents subsequent access to the remotely hosted application through the client device in response to detecting that the collected user input received by the client device is indicative of machine behavior that simulates inputs provided by a user. In this way the client device protects the remotely hosted application from malicious attacks performed on or through the client device.

Figure 3:
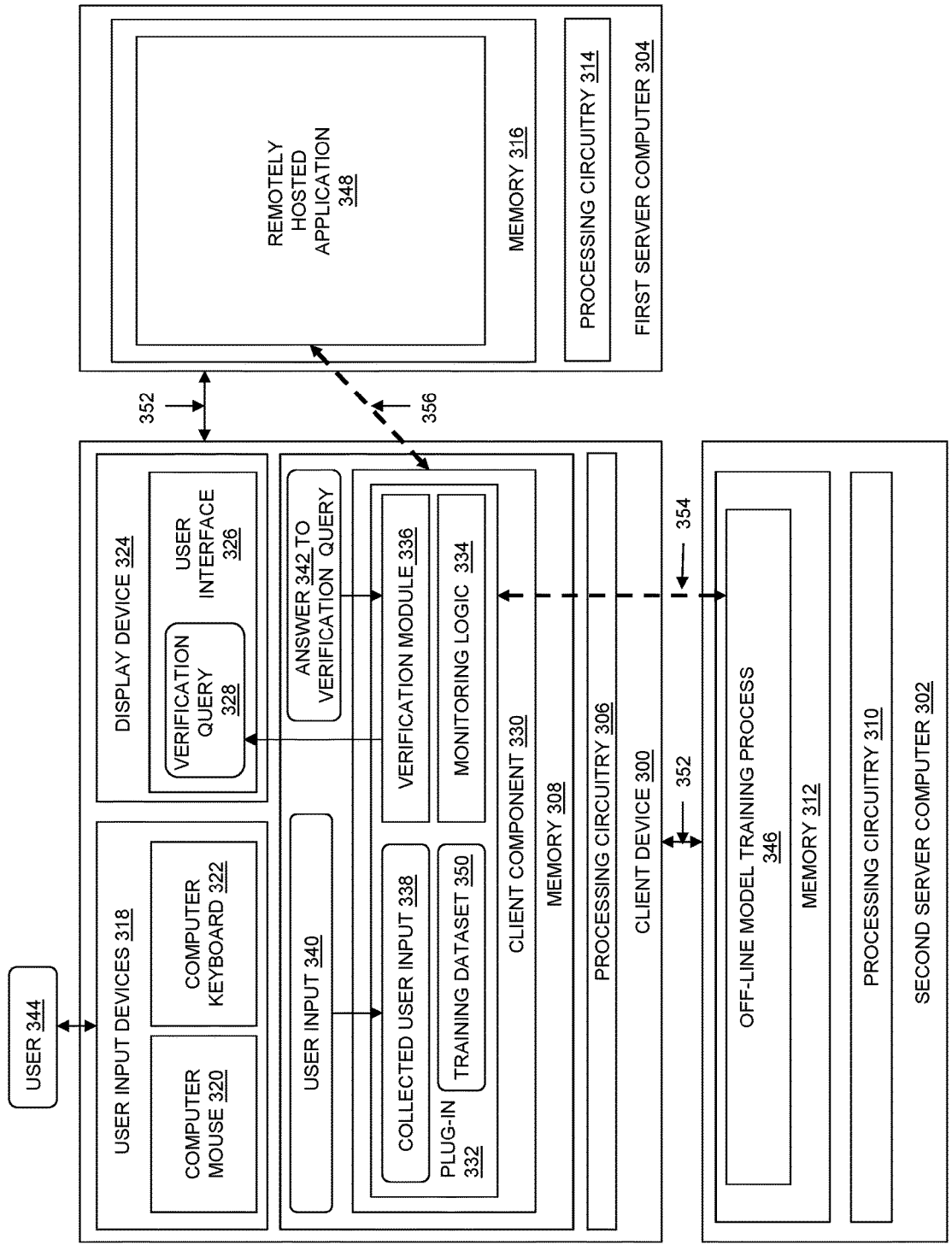
FIG. 3 is a block diagram showing an example of components and an operational environment for some embodiments.

FIG. 3 is a block diagram showing an example of the components of some embodiments, within an operational environment. As shown in FIG. 1, Client Device 300 provides access to one or more applications executing on one or more remote servers, e.g. to Remotely Hosted Application 348 executing on First Server Computer 304. For example, Client Device 300 may provide User 344 with access to Remotely Hosted Application 348 through a User Interface 326. Client Device 300 may include Processing Circuitry 306, Memory 308, User Input Devices 318, and a Display Device 324. Client Device 300 may be a mobile device, such as a smartphone, tablet computer, e-book reader, etc., or a laptop or desktop computer. Processing Circuitry 306 may include or consist of one or more Central Processing Units (CPUs) and associated hardware circuitry that executes the program code stored in Memory 308, e.g. program code of applications and/or an operating system, and/or other program code stored in the Memory 308. Memory 308 may include or consist of some combination of Random Access Memory (RAM) and Read Only Memory (ROM), and is used i) to store program code that executes on Processing Circuitry 306, and ii) to store data generated by and/or accessed by such program code. For example, Memory 308 is shown including a Client Component 330 that executes on Processing Circuitry 306. Those skilled in the art will recognize that Memory 308 may also include other program code that executes on Processing Circuitry 306, such as, for example, an operating system, and/or other application program code.

Display Device 324 of Client Device 300 may include or consist of an electronic visual display. The Display Device 324 displays a graphical user interface including or consisting of one or more user interfaces (e.g. windows) generated by program code executing in the Client Device 300. During operation, Display Device 324 displays a User Interface 326, which is generated in whole or in part by execution of Client Component 330 while Client Component 330 provides a User 344 of Client Device 300 with access to Remotely Hosted Application 348.

User Input Devices 318 of Client Device 300 may include a Computer Mouse 320 and a Computer Keyboard 322, and/or other devices that are operable to provide mouse inputs (e.g. mouse clicks, drags, etc.), and/or keyboard inputs (e.g. keystrokes, characters, etc.), in response to actions of User 344. For example, Computer Mouse 320 may consist of or include a mouse-type hand-held pointing device, a touchpad or trackpad, and/or another similar type of user input device. For example, Computer Keyboard 322 may consist of or include a typewriter-style keyboard device, a virtual keyboard provided through a touchscreen, and/or another similar type of user input device.

First Server Computer 304 may execute one or more applications that are accessed by User 344 through Client Device 300. For example, First Server Computer 304 may execute Remotely Hosted Application 348 accessed by User 344 of Client Device 300 through the User Interface 326. First Server Computer 304 may include Processing Circuitry 314 and Memory 316. First Server Computer 304 may include or consist of one or more server computers. Processing Circuitry 314 may include or consist of one or more Central Processing Units (CPUs) and associated hardware circuitry that executes the program code stored in the Memory 316, e.g. the program code of one or more applications, and/or the program code of an operating system, and/or other program code stored in Memory 316. Memory 316 may include or consist of some combination of Random Access Memory (RAM) and Read Only Memory (ROM), and is used i) to store program code that executes on Processing Circuitry 314, and ii) to store data generated by and/or accessed by such program code. For example, Memory 316 is shown including a Remotely Hosted Application 348 that executes on Processing Circuitry 314.

Those skilled in the art will recognize that Memory 316 may also include other program code that executes on Processing Circuitry 314, such as, for example, one or more operating system instances, a hypervisor or the like, and/or program code of other remotely hosted applications.

Second Server Computer 302 may execute an off-line model training process (e.g. Off-Line Model Training Process 346) that generates and optimizes a trained model that is contained in Monitoring Logic 334. For example, Off-Line Model Training Process 346 may generate an initial version of Monitoring Logic 334 for Plug-in 332 that contains a trained model that is generated based on an initial version of Training Dataset 350 (e.g. containing manually labeled sets of user input), and then later automatically generate an updated version of Plug-in 332 that includes a new version of Monitoring Logic 334 with an updated version of the trained model that is generated based on a modified Training Dataset 350 received by Off-Line Model Training Process 346 from the Client Device 300.

Second Server Computer 302 may include Processing Circuitry 319 and Memory 312. Second Server Computer 302 may include or consist of one or more server computers. Processing Circuitry 310 may include or consist of one or more Central Processing Units (CPUs) and associated hardware circuitry that is operable to execute the program code of applications and an operating system that are stored in the Memory 312. Memory 312 may include or consist of some combination of Random Access Memory (RAM) and Read Only Memory (ROM), and is used i) to store program code that executes on Processing Circuitry 314, and ii) to store data generated by and/or accessed by such program code. For example, Memory 316 is shown including Off-Line Model Training Process 346 that executes on Processing Circuitry 310. Those skilled in the art will recognize that Memory 312 may also include other program code that executes on Processing Circuitry 310, such as, for example, one or more operating system instances, a hypervisor or the like, and/or program code of other remotely hosted applications.

Client Device 300, First Server Computer 304, and Second Server Computer 302 may be communicably interconnected by one or more computer networks 352, e.g. one or more Local Area Networks (LANs) and/or a Wide Area Network (WAN), etc.

During operation of the components shown in FIG. 1, Client Device 300 provides a user of Client Device 300 (e.g. User 344) with access to Remotely Hosted Application 348. For example, Client Device 300 may use Client Component 330 to provide User 344 with access to Remotely Hosted Application 348 through the User Interface 326. In some embodiments, Client Component 330 may access Remotely Hosted Application 348 over a network connection 356 established between Client Device 300 and the First Server Computer 304. Network connection 356 may, for example, be a secure connection provided using a secure communication protocol such as HTTPS (HyperText Transfer Protocol Secure), or some other communication protocol.

In some embodiments, Client Component 300 may consist of or include a Web browser application. In other embodiments, Client Component 330 may consist of or include some other specific type of client software, e.g. a dedicated client component that corresponds to and is specifically designed to provide a user with access to Remotely Hosted Application 348.

In some embodiments, Remotely Hosted Application 348 may consist of or include remote application virtualization software executing on First Server Computer 304. In such embodiments, Client Component 330 provides User 344 with access (e.g. through User Interface 326) to a Remotely Hosted Application 348 that is a single virtualized application executing on First Server Computer 304. Examples of such a single virtualized application that may be provided by Remotely Hosted Application 348 may include without limitation an electronic mail application, a word processing application, an electronic spreadsheet application, an electronic calendaring application, an electronic presentation application, or some other specific type of application program.

In other embodiments, Remotely Hosted Application 348 may consist of or include remote desktop virtualization software executing on First Server Computer 304. In such embodiments, Client Component 330 provides User 344 with access (e.g. through User Interface 326) to a virtual desktop that belongs to User 344, and that is generated by execution of Remotely Hosted Application 348 on First Server Computer 304. Further in such embodiments in which Remotely Hosted Application 348 generates a virtual desktop or virtual workspace environment for User 344, User 344 may also access multiple specific virtualized applications executing on First Server Computer 304 through the virtual desktop provided by Remotely Hosted Application 348 and displayed by Client Component 330 in User Interface 326.

While providing User 344 with access to Remotely Hosted Application 348, Client Component 330 may transmit request messages to Remotely Hosted Application 348 in response to user input received by Client Device 300 and passed to Client Component 330. For example, requests conveyed from Client Component 330 to Remotely Hosted Application 348 may be conveyed using communication protocols such as HTTP (HyperText Transfer Protocol), RDP (Remote Desktop Protocol), ICA (Independent Computing Architecture), and/or other specific client/server protocols. Client Component 330 may modify the contents of User Interface 326 in response to the contents of reply messages that it receives from Remotely Hosted Application 348.

In the example of FIG. 1, user input received by Client Device 300 is shown for purposes of illustration by User Input 340. In some embodiments, the User Input 340 received by Client Device 300 may be passed to and received by Client Component 330. During normal operation User Input 340 may, for example, consist of or include computer mouse input, e.g. data describing mouse clicks performed by User 344 within User Interface 326 using Computer Mouse 320, and/or mouse drags performed by User 344 within User Interface 326 using Computer Mouse 320, etc. In another example, User Input 340 may, during normal operation, consist of or include computer keyboard input, e.g. keyboard characters entered by User 344 into User Interface 326 using Computer Keyboard 322. Those skilled in the art will recognize that other types of user input information may also or alternatively be included within User Input 340.

Embodiments of the disclosed technology may advantageously operate to protect Remotely Hosted Application 348 from cyberattacks on Client Device 300. For example, embodiments of the disclosed technology may protect Remotely Hosted Application 348 from malware that, during a cyberattack, generates user input that simulates inputs provided by a user, and that passes such malicious user input to Client Device 300 and/or Client Component 330, e.g. within User Input 340.

In order to protect Remotely Hosted Application 348 from cyberattacks on Client Device 300, Client Device 300 collects at least some portion of the User Input 340 that is received by Client Device 300. For example, in some embodiments, Client Component 330 may include a Plug-in 332 that is installed in Client Component 330, and Plug-in 332 may include Monitoring Logic 334 that periodically collects Collected User Input 338 from User Input 340, e.g. while User Input 340 is being received by Client Component 330. In some embodiments, Collected User Input 338 may contain some or all of the user input received by Client Component 330 during a corresponding time period. In such embodiments, Monitoring Logic 334 may periodically generate Collected User Input 338 by capturing and storing some or all of the user input received by Client Component 330 during a corresponding time period, for example by collecting and storing the user input that is received by Client Component 330 during each consecutive time period (e.g. during each consecutive two second time period) into a Collected User Input 338 generated for that time period.

Each time Collected User Input 338 is generated, it is analyzed by Client Device 300 in order to detect whether Collected User Input 338 indicates machine behavior that simulates inputs provided by a user. For example, in some embodiments, Monitoring Logic 334 may analyze Collected User Input 338 to detect whether Collected User Input 338 indicates machine behavior that simulates inputs provided by a user. In some embodiments, Monitoring Logic 334 may include a trained model that can be used in detection of Collected User Input 338 indicative of machine behavior that simulates inputs provided by a user, as further described below.

Collected User Input 338 may be periodically collected and analyzed (e.g. by Monitoring Logic 334 in Plug-in 332) prior to processing of Collected User Input 338 by Client Component 330, or after processing of Collected User Input 338 by Client Component 330. In some embodiments, Monitoring Logic 334 collects and analyzes Collected User Input 338 before Collected User Input 338 is passed to Client Component 330 for processing by Client Component 330, e.g. before Client Component 330 performs processing on Collected User Input 338 to prepare Collected User Input 338 for transmission to Remotely Hosted Application 348. Alternatively, in other embodiments, Monitoring Logic 334 may collect and analyze Collected User Input 338 after Client Component 330 has processed Collected User Input 338 to prepare Collected User Input 338 for transmission to Remotely Hosted Application 348. In either case, Monitoring Logic 334 may operate to collect and analyze Collected User Input 338 before Collected User Input 338 is transmitted from Client Component 330 to the Remotely Hosted Application 348.

Client Device 338 may prevent subsequent access to Remotely Hosted Application 348 through Client Device 338 in response to Client Device 338 detecting that Collected User Input 338 is indicative of machine behavior that simulates inputs provided by a user. For example, in some embodiments, Plug-in 332 may operate to prevent subsequent access to Remotely Hosted Application 348 through Client Device 338 in response to Monitoring Logic 334 detecting that Collected User Input 338 is indicative of machine behavior that simulates inputs provided by a user, by preventing subsequent access to Remotely Hosted Application 348 through Client Component 330. In some embodiments, Plug-in 332 may prevent subsequent access to Remotely Hosted Application 348 through Client Device 338 in response to Monitoring Logic 334 detecting that Collected User Input 338 is indicative of machine behavior that simulates inputs provided by a user by suspending further execution of Client Component 330 on Client Device 300. For example, Plug-in 332 may suspend further execution of Client Component 330 on Client Device 300 by preventing Client Component 330 from being subsequently scheduled for execution on Processing Circuitry 306. In another example, Plug-in 332 may suspend further execution of Client Component 330 on Client Device 300 at least in part by preventing Client Component 330 and/or Client Device 300 from subsequently communicating with Remotely Hosted Application 348. By suspending further execution of Client Component on Client Device 300 upon detecting that Collected User Input 338 is indicative of machine behavior that simulates inputs provided by a user, Client Device 300 advantageously protects Remotely Hosted Application 348 from malware-generated user input during a cyberattack performed on or through Client Device 300 in which malware is attempting to gain unauthorized access to and/or compromise the legitimate operation of the Remotely Hosted Application 348.

In some embodiments, further in response to detecting that Collected User Input 338 is indicative of machine behavior that simulates inputs provided by a user, and before preventing subsequent access to the Remotely Hosted Application 348 through the Client Device 300, Client Device 300 may display at least one verification query in a user interface of the Client Device 300. For example, in some embodiments, in response to Monitoring Logic 334 detecting that Collected User Input 338 is indicative of machine behavior that simulates inputs provided by a user, and before Plug-in 332 prevents subsequent access to the Remotely Hosted Application 348 through the Client Device 300, a Verification Module 336 in Plug-in 332 may display a Verification Query 328 on Display Device 324, e.g. within User Interface 326. In some embodiments, Verification Query 328 may include or consist of one or more questions that can only be answered correctly by a human user of Client Device 300. For example, in some embodiments, Verification Query 328 may include or consist of a CAPTCHA ("Completely automated Turing test to tell computers and humans apart") type of challenge-response test that verifies whether or not the User Input 340 that is being received by Client Device 300 is being provided by a human user. As it is generally known, a CAPTCHA type of challenge-response test may require User 344 to correctly select specific portions of Verification Query 328 that contain images of specified items. Alternatively, the disclosed technology may use some other specific type of human user verification provided through the Verification Query 328 in order to verify whether or not the User Input 340 is being received by Client Device 300 is being provided by a human user. In some embodiments, Verification Query 328 may additionally or alternatively include or consist of a pop-up verification query displayed to User 144, which may require that User 144 correctly enter their login user name and password, and/or enter some man-machine identification verification code, either before or in lieu of a CAPTCHA challenge-response. In such embodiments, Answer 342 may include or consist of the answer provided by User 144 to the verification query, e.g. a login user name and password entered by User 144. In other embodiments, Verification Module 336 may generate a Verification Query 328 that requests that the User 144 provide biometric identification that confirms that the User 144 is providing User Input 240. Such biometric identification may, for example, be provided through fingerprint scanning, iris scanning, and/or some other specific technique for acquiring biometric identification information from User 144. In such embodiments, Answer 342 may include or consist of biometric identification information provided by User 144.

After displaying the Verification Query 328, Client Device 300 (e.g. Verification Module 336) receives at least one answer to Verification Query 328. For example, in some embodiments, Verification Module 336 may receive Answer 342 to Verification Query 328. Verification Module 336 may then analyze Answer 342, in order to determine whether Answer 342 indicates that the User Input 340 received by the Client Device 300 is being provided by a human user. For example, in various specific embodiments, Verification Module 336 may determine that User Input 340 is being provided by a human user when Answer 342 indicates that User 344 has selected the correct specific portions of User Interface 326 as part of a CAPTCHA challenge-response, when Answer 342 contains a valid login user name and password, and/or when Answer 342 contains valid biometric identification information.

In some embodiments, Client Device 300 (e.g. Plug-in 332) may prevent subsequent access to Remotely Hosted Application 348 through Client Device 300 (e.g. by suspending further execution of Client Component 330 on Client Device 300) only in response to both i) Monitoring Logic 334 detecting that Collected User Input 338 is indicative of machine behavior that simulates inputs provided by a user, and ii) Verification Module 336 determining that Answer 342 to Verification Query 328 indicates that the User Input 340 received by the client device is not being provided by a human user. However, it should be recognized that the disclosed technology is not limited to such embodiments, and that in some embodiments, Client Device 300 (e.g. Plug-in 332) may prevent subsequent access to Remotely Hosted Application 348 through Client Device 300 (e.g. by suspending further execution of Client Component 330 on Client Device 300) in response to only Monitoring Logic 334 detecting that Collected User Input 338 is indicative of machine behavior that simulates inputs provided by a user.

In some embodiments, Client Device 300 (e.g. Plug-in 332) may, in response to both i) Monitoring Logic 334 detecting that Collected User Input 338 is indicative of machine behavior that simulates inputs provided by a user, and ii) Verification Module 336 determining that Answer 342 indicates that User Input 340 is being provided by a human user, modify a Training Dataset 350 to generate a modified Training Dataset 350 that indicates that Collected User Input 338 does not indicate machine behavior that simulates inputs provided by a user. For example, in some embodiments, Plug-in 332 may modify Training Dataset 350 by adding Collected User Input 338 to Training Dataset 350 together with a label or tag indicating that Collected User Input 338 does not indicate machine behavior that simulates inputs provided by a user.

In some embodiments, Client Device 300 (e.g. Plug-in 332) may pass the modified Training Dataset 350 from the Client Device 300 to the Off-Line Model Training Process 346 executing on the Second Server Computer 302. Offline Model Training Process 346 may then generate a new, updated version of the Plug-in 332 based on the modified Training Dataset 350. Offline Model Training Process 346 may then automatically replace an earlier version of Plug-in 332 that was previously installed in the Client Component 330 with the updated version of the Plug-in 332, e.g. by installing the updated version of the Plug-in 332 in Client Component 330. In this way, the disclosed technology may be embodied such that the accuracy of Monitoring Logic 334 with regard to correctly determining whether Collected User Input 338 indicates machine behavior that simulates inputs provided by a user can be continuously improved based on feedback provided from Plug-in 332 to Off-Line Model Training Process 346.

In some embodiments, an initial version of Plug-in 332 may be generated by Offline Model Training Process 346, including an initial version of Monitoring Logic 334 that includes a trained model that is generated based on an initial version of Training Dataset 350 that contains sets of user input manually or automatically labeled using previously determined information and/or predictions regarding specific sets of user input that have been determined a priori (e.g. based on cyberattack modeling, etc.) to indicate machine behavior that simulates inputs provided by a user. Such an initial version of Plug-in 332 may then be installed in Client Component 330. As Client Component 330 executes, the initial version of Plug-in 332 may subsequently be replaced by updated versions of Plug-in 332 having improved accuracy with regard to detecting whether specific sets of user input indicate machine behavior that simulates inputs provided by a user.

Figure 4:
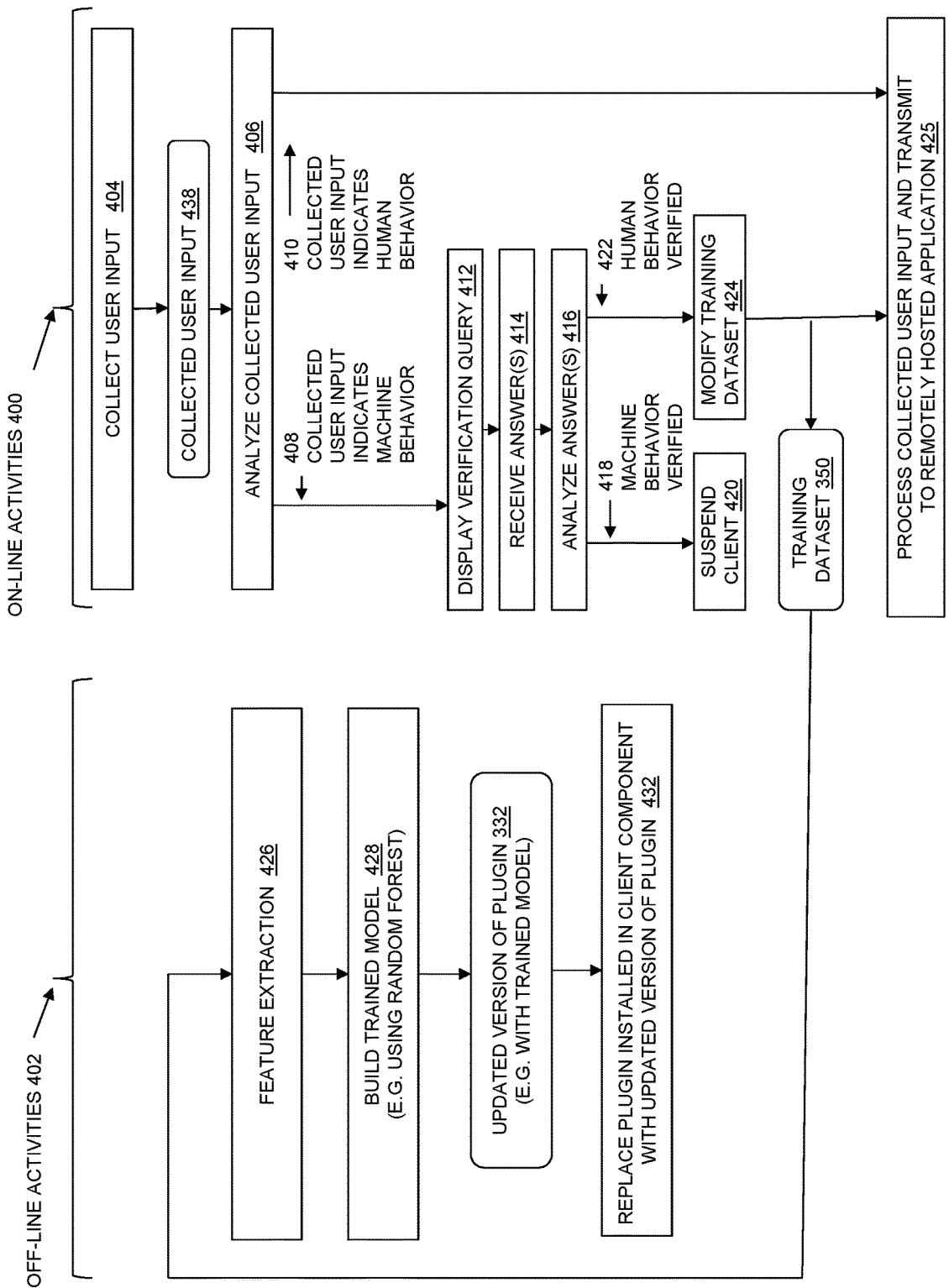
FIG. 4 is a flow chart showing a first example of steps performed during operation of some embodiments.

FIG. 4 is a flow chart showing a first example of steps performed during operation of some embodiments. As shown in FIG. 4, in some embodiments, a number of steps may be performed on-line, e.g. by Plug-in 332, as part of On-Line Activities 400. For example, in some embodiments, On-Line Activities 400 may be performed by Plug-in 332 while access to Remotely Hosted Application 348 is being provided to User 344 by Client Device 300.

As also shown in FIG. 4, in some embodiments a number of steps may be performed off-line, as part of Off-Line Activities 402. For example, in some embodiments, Off-Line Activities 402 may be performed by Off-Line Model Training Process 346, e.g. while Client Device 300 is providing access to Remotely Hosted Application 348, and/or at a time or times when Client Device 300 is not providing access to Remotely Hosted Application 348.

In the example of FIG. 4, at step 404 within On-Line Activities 400 user input is collected by Client Device 300. For example, in some embodiments, at step 404 the Monitoring Logic 334 in Plug-in 332 may collect at least a portion of User Input 340 that is received by Client Component 330 during a corresponding time period (e.g. within a two second time period), and then store that portion of User Input 340 into Collected User Input 338 for discrete analysis by Monitoring Logic 334.

At step 406, the Client Device 300 analyzes Collected User Input 338 to detect whether Collected User Input 338 indicates machine behavior that simulates inputs provided by a user. For example, in some embodiments at step 406, Monitoring Logic 334 in Plug-in 338 analyzes Collected User Input 338 to detect whether Collected User Input 338 indicates machine behavior that simulates inputs provided by a user.

For example, in some embodiments, Monitoring Logic 334 analyzes Collected User Input 338 by generating a feature vector for Collected User Input 338, and then using a trained model to detect whether Collected User Input 338 indicates machine behavior that simulates inputs provided by a user. In some embodiments, the trained model in Monitoring Logic 334 may detect that Collected User Input 338 indicates machine behavior that simulates inputs provided by a user when the feature vector extracted from Collected User Input 338 matches a feature vector that was previously labeled as indicative of machine behavior that simulates inputs provided by a user.

Accordingly, the trained model may compare the feature vector for Collected User Input 338 to previously labeled feature vectors. The previously labeled feature vectors may, for example, have been automatically labeled by Off-Line Model Training Process 346, or manually labeled by a system administrator or the like. The feature vector extracted for Collected User Input 338 and compared to the previously labeled feature vectors may contain one or more features that describe specific characteristics of the Collected User Input 338. In some embodiments, the features in the feature vector extracted for Collected User Input 338 may indicate statistical characteristics of mouse actions (e.g. mouse clicks) performed within Collected User Input 338. For example, such statistical features of mouse actions performed within Collected User Input 338 may describe or be derived from the total number of mouse actions performed, numbers of mouse actions performed per screen areas within user interface 326, time intervals between consecutive mouse actions, and/or a number of times some predetermined number (e.g. three) of consecutive identical mouse actions were performed. Accordingly, in some embodiments, for example, the trained model in Monitoring Logic 334 may detect that Collected User Input 338 indicates machine behavior that simulates inputs provided by a user when a feature vector of mouse action statistics for Collected User Input 338 matches a feature vector of mouse action statistics that was previously labeled as indicative of machine behavior that simulates inputs provided by a user.

In the case where Client Device 300 detects 408 that Collected User Input 338 indicates machine behavior that simulates inputs provided by a user, step 406 is followed by step 412. Otherwise, in the case where Client Device 300 detects 410 that Collected User Input 338 does not indicate machine behavior that simulates inputs provided by a user, step 406 is followed by step 425. In step 425, Client Component 330 may complete processing of Collected User Input 338 (e.g. prepare Collected User Input 338 for transmission to Remotely Hosted Application 348), and then securely transmit Collected User Input 338 from Client Device 300 to the Remotely Hosted Application 348.

At step 412, Client Device 300 displays a verification query. For example, in some embodiments, at step 412

Verification Module 336 in Plug-in 332 of Client Component 330 displays a CAPTCHA type Verification Query 328 in User Interface 326.

At step 414, one or more answers are received by Client Device 300 to the verification query displayed at step 412. For example, in some embodiments, at step 414 Answer 342 to the displayed verification query may be received by the Verification Module 336 in Plug-in 332 of Client Component 330.

At step 416, Client Device 300 analyzes the answer or answers to the verification query to determine whether the answer or answers indicate that the user input being received by the Client Device 300 is being provided by a human user. For example, in some embodiments, at step 416 Answer 342 to the displayed verification query may be analyzed by Verification Module 336 in Plug-in 332 of Client Component 330 to determine whether user input being received by Client Component 330 is being provided by a human user, e.g. by determining whether the User 344 has selected the correct specific portions of User Interface 326 as part of a CAPTCHA challenge-response, provided a valid login user name and password, and/or provided valid biometric identification information.

In the case where Client Device 300 (e.g. Verification Module 336) determines 422 that the user input being received by Client Device 300 (e.g. received by Client Component 330) is being provided by a human user, then the analysis of Collected User Input 338 performed at step 406 (e.g. as performed by Monitoring Logic 334 in Plug-in 332) was incorrect, and step 416 is followed by step 424. Otherwise, in the case where Client Device 300 (e.g. Verification Module 336) determines 418 that the user input received by Client Device 300 (e.g. received by Client Component 330) is not being provided by a human user, then the analysis of Collected User Input 338 performed at step 406 (e.g. by Monitoring Logic 334 in Plug-in 332) was correct, and step 416 is followed by step 420.

At step 420, Client Device 300 prevents subsequent access to the Remotely Hosted Application 348 through the Client Device 300. For example, in some embodiments, at step 420 Plug-in 332 may prevent subsequent access to the Remotely Hosted Application 348 through Client Device 300 by suspending the execution of Client Component 330 on Client Device 300. In some embodiments, preventing subsequent access to the Remotely Hosted Application 348 through Client Device 300 at step 420 may include preventing Collected User Input 338 from being transmitted to Remotely Hosted Application 348, in order to prevent the delivery of malware-generated user input to Remotely Hosted Application 348, and to prevent the computer network(s) that interconnects Client Device 300 and First Server Computer 304 from being burdened with network traffic carrying malware-generated user input from Client Device 300 to First Server Computer 304.

At step 424, Client Device 300 modifies Training Dataset 350 to indicate that Collected User Input 338 does not reflect machine behavior that simulates inputs provided by a user. For example, in some embodiments, at step 424 Plug-in 332 modifies Training Dataset 350 by adding Collected User Input 338 to Training Dataset 350 together with a label or tag indicating that Collected User Input 338 does not reflect machine behavior that simulates inputs provided by a user. In some embodiments, Training Dataset 350 may include multiple sets of collected user input, each one of which having a label that indicates whether that set of collected user input reflects machine behavior that simulates inputs provided by a user. At a subsequent point in time, Training Dataset 350 is transmitted from Client Device 300 to Second Server Computer 302 for use by Off-line Model Training Logic 346 when Off-line Model Training Logic 346 generates a new version of Plug-in 332 that more accurately detects when a set of collected user input indicates machine behavior that simulates inputs provided by a user. In this way, embodiments of the disclosed technology may apply machine learning techniques to continuously improve the accuracy of Plug-in 332 with regard to detecting when a set of collected user input indicates machine behavior that simulates inputs provided by a user.

Further in the On-Line Activities 400, step 424 is followed by step 425, in which Client Component 330 may complete processing of Collected User Input 338 (e.g. by preparing Collected User Input 338 for transmission to Remotely Hosted Application 348), and then securely transmit Collected User Input 338 from Client Device 300 to the Remotely Hosted Application 348.

Training Dataset 350 is received from Client Device 300 by Second Server Computer 102 and passed to Off-Line Model Training Logic 346. At step 426 Off-line Model Training Logic 346 performs feature extraction on the labeled sets of collected user input that are contained in Training Dataset 350. During feature extraction, Off-line Model Training Logic 346 generates a feature vector for each set of collected user inputs in Training Dataset 350, and assigns a label to each feature vector that is the same label as was assigned to the set of collected user input in Training Dataset 350 from which the feature vector was generated.

For example, in the case where Collected User Input 338 was added to Training Dataset 350 at step 424, and Collected User Input 338 was stored in Training Dataset 350 with a label indicating that Collected User Input 338 does not reflect machine behavior that simulates inputs provided by a user (e.g. Label=0), then during the feature extraction performed at step 426 Off-line Model Training Logic 346 may generate a feature vector corresponding to Collected User Input 338, and assign a label to that feature vector indicating that subsequently received sets of collected user input having feature vectors that match the generated feature vector do not reflect machine behavior that simulates inputs provided by a user (e.g. Label=0).

The labeled feature vectors extracted at step 426 from the labeled sets of collected user input in Training Dataset 350 are then stored by the Off-line Model Training Logic 346 at step 428 into a trained model, e.g. using machine learning techniques that may include but are not limited to random forest techniques. The trained model automatically generated at step 428 by the Off-line Model Training Logic 346 includes decision logic that is operable, when executed, to detect whether sets of collected user input indicate machine behavior that simulates inputs provided by a user, as indicated by the labeled feature vectors extracted at step 426. Specifically, the trained model generated at step 428 operates, when executed, to detect that a subsequently received set of collected user input indicates machine behavior that simulates inputs provided by a user when that subsequently received set of collected user input has a feature vector that matches one of the feature vectors extracted at step 426 that was labeled as indicating machine behavior that simulates inputs provided by a user (e.g. Label=1). On the other hand, the trained model generated at step 428 operates, when executed, to detect that a subsequently received set of collected user input does not indicate machine behavior that simulates inputs provided by a user when that subsequently received set of collected user input has a feature vector that matches one of the feature vectors extracted at step 426 that was labeled as not indicating machine behavior that simulates inputs provided by a user (e.g. Label=0).

In some embodiments, the trained model generated at step 428 may be integrated by Off-line Model Training Logic 346 into a new version of the Monitoring Logic 334 in a new, updated version of the Plug-in 332 that is generated by Off-line Model Training Logic 346 at step 428. In this way, during steps 426 and 428, Off-line Model Training Logic 346 may generate an updated version of Plug-in 332 based on the Training Dataset 350 received from Client Device 300.

For example, in some embodiments the disclosed technology may use a framework such as TensorFlow or the like to facilitate integration of the trained model into a new version of the Monitoring Logic 334 in the new, updated version of the Plug-in 332. In such embodiments, the trained model may be saved and reloaded as labeled feature vectors, and only the newly extracted feature vectors need to be loaded when the trained model is updated in a new version of the Monitoring Logic 334 in the updated version of the Plug-in 332.

At step 432, Off-line Model Training Logic 346 may automatically replace a previously installed version of Plug-in 332 in Client Component 330 with the updated version of Plug-in 332. In some embodiments, Off-line Model Training Logic 346 may automatically replace the previously installed version of Plug-in 332 in Client Component 330 with the updated version of Plug-in 332 while Client Component 330 is executing on Client Device 300. Alternatively, Off-line Model Training Logic 346 may automatically replace the previously installed version of Plug-in 332 in Client Component 330 with the updated version of Plug-in 332 while Client Component 330 is not executing on Client Device 300, e.g. prior to installation of Client Component 330 on Client Device 300.

Figure 5:
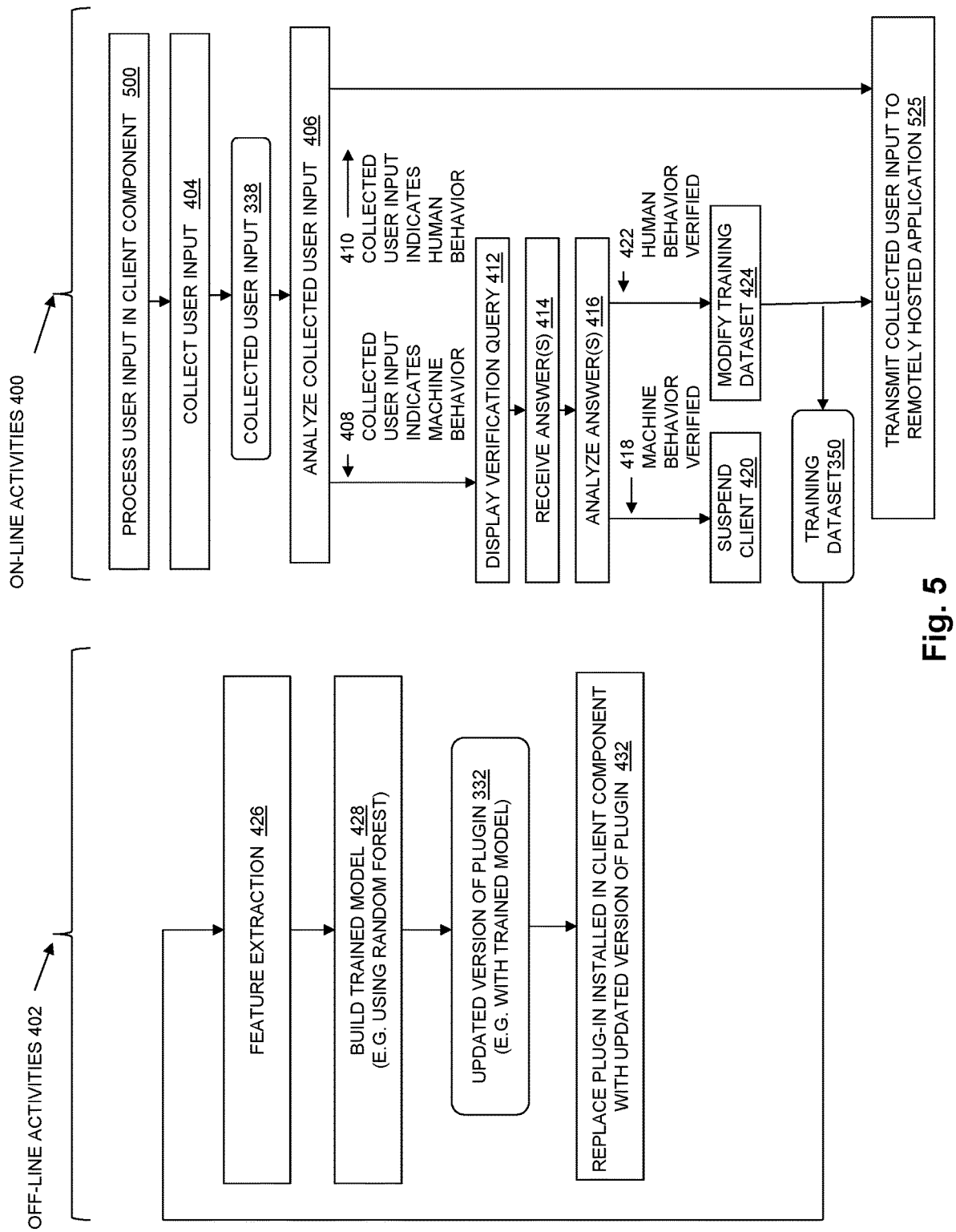
FIG. 5 is a flow chart showing a second example of steps performed during operation of some embodiments.

FIG. 5 is a flow chart showing a second example of steps performed during operation of some embodiments. In the example of FIG. 5, the steps shown in FIG. 4 and described above with reference to FIG. 4 are modified such that Collected User Input 338 is collected at step 404 after Client Component 330 has processed Collected User Input 338 at step 500 (e.g. by preparing Collected User Input 338 for transmission to Remotely Hosted Application 348), and before Client Component 330 has transmitted Collected User Input 338 to Remotely Hosted Application 348 at step 525. Accordingly, in the steps of FIG. 5, any processing of the Collected User Input 338 that is performed by the Client Component 330 is performed before Collected User Input 338 is analyzed by Monitoring Logic 334. In contrast, in the steps of FIG. 4, Collected User Input 338 is analyzed by Monitoring Logic 334 before Collected User Input 338 is processed by Client Component 300. Accordingly, in embodiments in which Client Component 300 processes Collected User Input 338 by preparing Collected User Input 338 for transmission to Remotely Hosted Application 348, FIG. 5 illustrates how Collected User Input 338 may be prepared for transmission to Remotely Hosted Application 348 prior to analysis of Collected User Input 338 by Monitoring Logic 334. In both FIG. 4 and FIG. 4, malware-generated user input is detected by Monitoring Logic 334 prior to transmission of Collected User Input 338 to the Remotely Hosted Application 348.

Further in the steps of FIG. 5, in the case where the analysis of the Collected User Input 338 performed at step 406 detects 410 that Collected User Input 338 does not indicate machine behavior that simulates inputs provided by a user, then step 406 is followed by step 525, in which the Collected User Input 338 is transmitted from Client Device 300 to the Remotely Hosted Application 348, without further processing by Client Component 330, since Client Component 300 has already prepared Collected User Input 338 for transmission to the Remotely Hosted Application 348.

Figure 6:
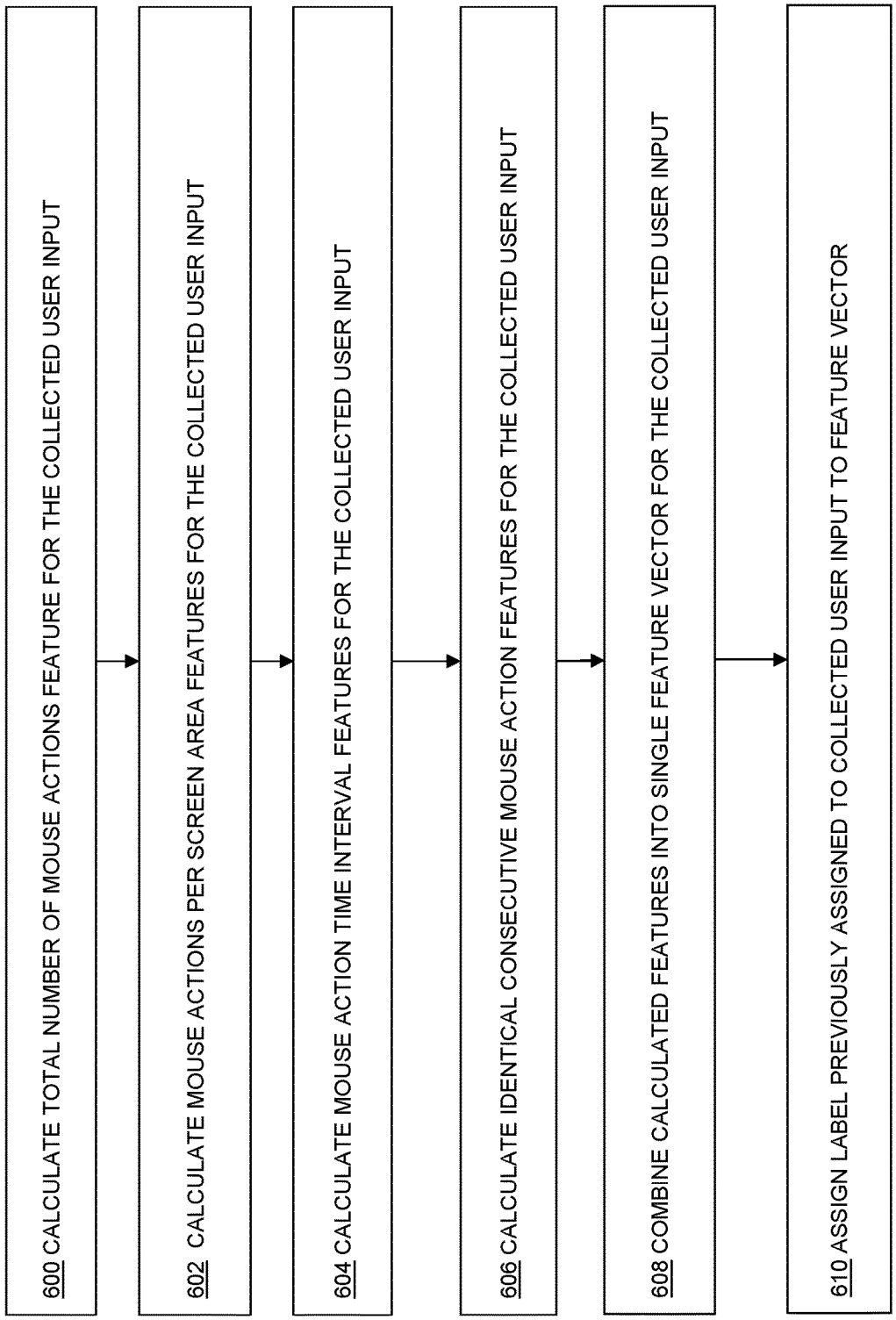
FIG. 6 is a flow chart showing steps performed during operation of some embodiments while performing off-line model training.

FIG. 6 is a flow chart showing an example of steps performed during operation of some embodiments by Off-Line Model Training Process 346 while performing off-line model training to generate a labeled vector for each labeled set of collected user input in Training Dataset 350, e.g. at step 426 of FIG. 4 or FIG. 5. Steps 600-608 of FIG. 6 may also be performed by Monitoring Logic 334 to extract a feature vector from Collected User Input 338 for comparison with one or more previously labeled feature vectors while determining whether Collected User Input 338 indicates machine behavior that simulates inputs provided by a user.

In the example of FIG. 6, for purposes of explanation, each labeled feature vector extracted from a corresponding set of collected user input describes mouse inputs within that set of collected user input. However, the disclosed technology is not limited to embodiments that extract mouse input-related features. Those skilled in the art will recognize that the disclosed technology may be embodied to alternatively or additionally generate and operate based on other specific types of features that may be extracted from a corresponding set of collected user input, e.g. one or more features describing keyboard input, or describing some other type of user input, and/or other mouse input-related features different from those features described below.

At step 600, one or more features may be extracted from the set of collected user input that describe a total number of mouse actions contained in the set of collected user input. For example, a feature TOTAL_CLICKS may be generated at step 606 having a value equal to the total number of mouse actions (e.g. clicks) that are contained in the set of collected user input. Alternatively, or in addition, one or more features may be extracted that indicate a total number of some other type of user input action performed within the collected user input, e.g. a total number of keyboard actions.

At step 602, one or more features may be generated that describe the number of mouse actions that are performed within each one of multiple specific screen areas in the set of collected user input. For example, nine features FIRST_AREA_CLICKS, SECOND_AREA_CLICKS, THIRD_AREA_CLICKS, and so on through NINTH_AREA_CLICKS, may be generated at step 602, each of which describes a total number of mouse actions (e.g. clicks) that were performed on a corresponding one of nine discrete regions contained within the User Interface 326. For example, User Interface 326 may be divided into multiple regions, and a feature generated for each region having a value equal to the total number of mouse actions performed within that region. For example, User Interface 326 may be divided into nine equal size regions (e.g. nine square regions), and a corresponding feature may be generated at step 602 for each one of those nine regions, having a value equal to the total number of mouse actions (e.g. clicks) in the set of collected user input that were performed within the corresponding region of the User Interface 326. Alternatively, a feature may be extracted that is equal to the total number of mouse actions performed in a single portion of the User Interface 326 having particular interest, e.g. a center part of the User Interface 326 typically containing a login menu or one or more buttons, in order to conserve resources (e.g. battery, processor) of the Client Device 300 that would otherwise be used to count mouse actions throughout the User Interface 326.

At step 604, one or more mouse action time interval features may be generated that describe the time intervals between mouse actions contained in the set of collected user input.

For example, a MAX_INTERVAL feature may be generated at step 604 having a value equal to the maximum time interval between two consecutive mouse actions contained in the set of collected user input. The time interval between two consecutive mouse actions may, for example, consist of an amount of time between a pair of consecutive mouse actions that are directly adjacent in time, or that are separated by other types of user input actions. For example, in the case where a first mouse click (e.g. selection of a password entry field or the like within User Interface 326) is followed by some number of keyboard actions (e.g. multiple keyboard characters, such as a password), which are then followed by a second mouse click (e.g. clicking on an "enter" button or the like), then the first mouse action and the second mouse action are still consecutive mouse actions regardless of the keyboard actions interspersed between them, and the mouse action time interval between the first mouse action and the second mouse action would be calculated as a total amount of time measured or calculated between the time at which the first mouse action occurred and the time at which the second mouse action occurred.

In another example, a MIN_INTERVAL feature may be generated at step 604 having a value equal to the minimum time interval between two consecutive mouse actions contained in the set of collected user input. In another example, a MEAN_INTERVAL feature may be generated at step 604 having a value equal to the average time interval between consecutive mouse actions contained in the set of collected user input. And in another example, an INTERVAL_VARIANCE feature may be generated at step 604 having a value equal to the variance of the time intervals between consecutive mouse actions in the set of collected user input.

At step 606 one or more identical consecutive mouse action features may be generated that describe how often three consecutive identical mouse actions occurred in the set of collected user input. For example, a RATIO_CONSECUTIVE_IDENTICAL_TRIPLES feature may be generated at step 606 having a value equal to the ratio of i) the total number of times that three consecutive identical mouse actions were performed in the collected user input, to ii) the total number of mouse actions in the set of collected user input. In another example, a FREQUENCY_CONSECUTIVE_IDENTICAL_TRIPLES feature may be generated at step 606 having a value equal to the frequency at which three consecutive identical mouse actions were performed in the set of collected user input. In another example, a MAX_CONSECUTIVE_IDENTICAL_TRIPLES_INTERVAL feature may be generated at step 606 having a value equal to the maximum time interval between occurrences of three consecutive identical mouse actions in the set of collected user input. And in another example, a MIN_CONSECUTIVE_IDENTICAL_TRIPLES_INTERVAL feature may be generated at step 606 having a value equal to the minimum time interval between occurrences of three consecutive identical mouse actions in the set of collected user input.

At step 608, the features generated in steps 600 through 606 are combined into a single feature vector for the set of collected user input.

At step 610, the label assigned to the set of collected user input in the Training Dataset 350 from which the feature vector was generated is assigned to the generated feature vector.

For example, in some embodiments, a training dataset may include sets of collected user inputs and associated labels as follows (e.g. Label=1 means indicates machine behavior that simulates inputs provided by a user, Label=0 means does not indicate machine behavior that simulates inputs provided by a user):

{Set of Collected User Inputs 1}, Label=1
{Set of Collected User Inputs 2}, Label=0
{Set of Collected User Inputs 3}, Label=1
{Set of Collected User Inputs 4}, Label=1
{Set of Collected User Inputs 5}, Label=0

For example, in some embodiments, each set of collected user inputs in the training dataset, and/or Collected User Input 338, may describe each individual mouse action that is contained within it by i) a 0 indicating that the mouse action is a left mouse click, or ii) a 1 indicating that the mouse action is a right mouse click, followed by a screen coordinate of the mouse action (e.g. (Xn, Yn)), followed by a time stamp indicating the time at which the mouse action occurred, as follows:

{0(X11, Y11), TIMESTAMP1; 1(X12, Y12), TIMESTAMP2; 0(X13, Y13), TIMESTAMP3; 1(X14, Y14), TIMESTAMP4; 1(X15, Y15), TIMESTAMP5; 0(X16, Y16), TIMESTAMP6; . . . }

For example, in some embodiments, Off-line Mode Training Logic 346 may generate labeled feature vectors for the above example training dataset as follows:

{Feature Vector 1}, Label=1
{Feature Vector 2}, Label=0
{Feature Vector 3}, Label=1
{Feature Vector 4}, Label=1
{Feature Vector 5}, Label=0

Note that each feature vector is assigned the same label as was assigned to the corresponding set of user input that the feature vector set was generated from. Per the example of FIG. 6, in some embodiments each generated feature vector may be made up of the following features:

{TOTAL_CLICKS; FIRST_AREA_CLICKS; SECOND_AREA_CLICKS; THIRD_AREA_CLICKS; FOURTH_AREA_CLICKS; FIFTH_AREA_CLICKS; SIXTH_AREA_CLICKS; SEVENTH_AREA_CLICKS; EIGTH_AREA_CLICKS; NINTH_AREA_CLICKS; MAX_INTERVAL; MIN_INTERVAL; MEAN_INTERVAL; INTERVAL_VARIANCE; RATIO_CONSECUTIVE_IDENTICAL_TRIPLES; FREQUENCY_CONSECUTIVE_IDENTICAL_TRIPLES; MAX_CONSECUTIVE_IDENTICAL_TRIPLES_INTERVAL; MIN_CONSECUTIVE_IDENTICAL_TRIPLES_INTERVAL}

In some embodiments, during operation of the Plug-in 332, Monitoring Logic 334 detects whether Collected User Input 338 indicates machine behavior that simulates inputs provided by a user based on a feature vector extracted from Collected User Input 338. In an embodiment in which Plug-in 332 is generated by Off-line Model Training Logic 346 in response to Training Dataset 350, Monitoring Logic 334 includes a trained model generated by Off-line Model Training Logic 346 (e.g. at step 428) using feature vectors extracted from the sets of collected user input in Training Dataset 350 (e.g. at step 426). Accordingly, Monitoring Logic 334 may generate a feature vector for Collected User Input 338, and then use the trained model in Monitoring Logic 334 to detect whether Collected User Input 338 indicates machine behavior that simulates inputs provided by a user based on the feature vector for Collected User Input 338.

For example, the trained model in Monitoring Logic 334 may detect that Collected User Input 338 indicates machine behavior that simulates inputs provided by a user in the case that a feature vector generated for Collected User Input 338 matches a previously labeled feature vector that was generated for a set of collected user input in Training Dataset 350 that was labeled as indicating machine behavior that simulates inputs provided by a user.

In another example, the trained model in Monitoring Logic 334 may detect that Collected User Input 338 does not indicate machine behavior that simulates inputs provided by a user in the case that a feature vector generated for Collected User Input 338 matches a previously labeled feature vector that was generated for a set of collected user input in Training Dataset 350 that was labeled as not indicating machine behavior that simulates inputs provided by a user.

Figure 7:
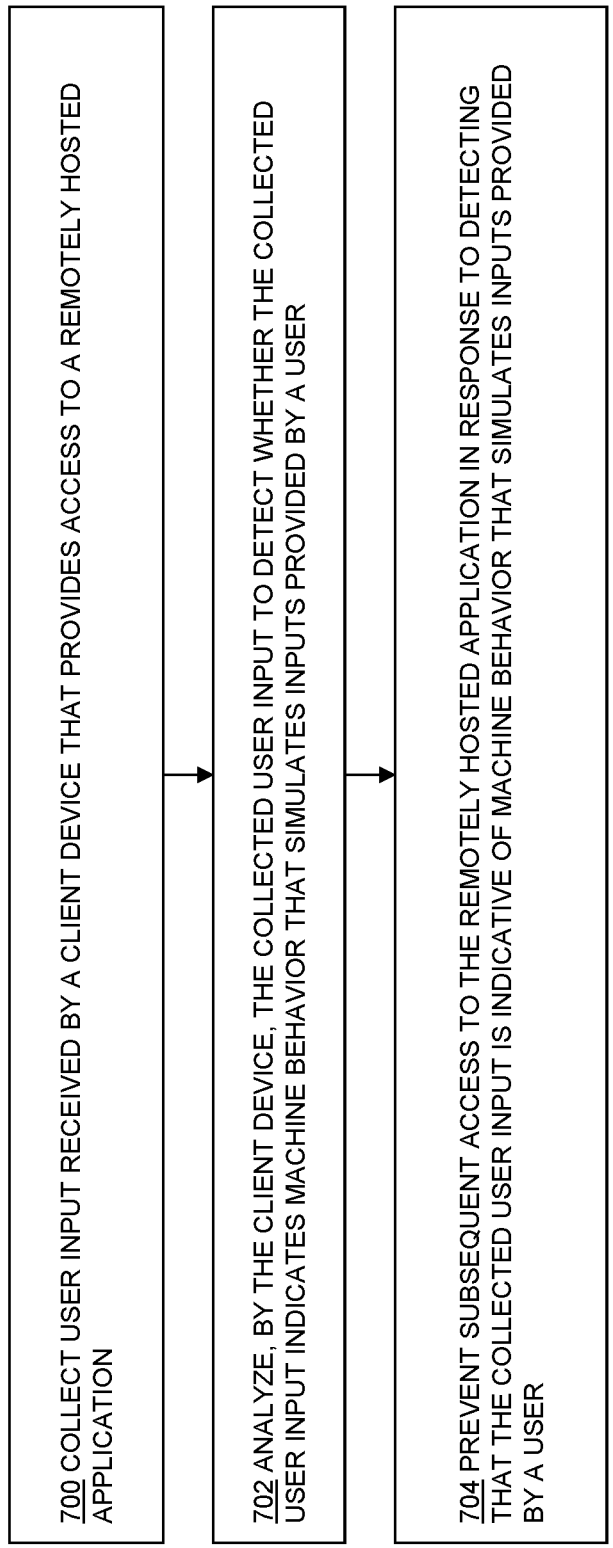
FIG. 7 is a flow chart showing another example of steps performed during operation of some embodiments.

FIG. 7 is a flow chart showing another example of steps performed during operation of some embodiments.

As shown in FIG. 7, at step 700 user input received by a client device that provides access to a remotely hosted application is collected.

At step 702, the client device analyzes the collected user input to detect whether the collected user input indicates machine behavior that simulates inputs provided by a user.

At step 704, subsequent access to the remotely hosted application is prevented in response to detecting that the collected user input is indicative of machine behavior that simulates inputs provided by a user.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

Aspects of the technologies disclosed herein may be embodied as a system, method or computer program product. Accordingly, elements described herein may be embodied using hardware, software (including firmware, resident software, micro-code, etc.) or a combination of software and hardware. Furthermore, functions of the embodiments illustrated herein may take the form of a computer program product embodied at least in part in one or more non-transitory computer readable storage medium(s) having computer readable program code stored thereon for causing one or more processors to carry out those functions.

Any combination of one or more non-transitory computer readable storage medium(s) may be utilized. Examples of a non-transitory computer readable storage medium include, but are not limited to, an optical disc (e.g. CD or DVD), an optical storage device, a magnetic disk, a magnetic storage device, a random access memory (RAM), a read-only memory (ROM), an erasable programmable read-only memory (EPROM or Flash memory), and/or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments. It will be understood that one or more of the block in such figures, and combinations of the blocks, can be implemented by computer program instructions. These computer program instructions may be executed on processing circuitry to form specialized hardware. The computer program instructions may further be loaded onto a computing device to produce a machine, such that the instructions which execute on the computing device create means for implementing the functions specified in the block or blocks. The computer program instructions may also be stored in a computer-readable memory that can direct a computing device to function in a particular manner, such that the instructions stored in the computer-readable memory produce an article of manufacture including instruction means which implement the function specified in the block or blocks. The computer program instructions may also be loaded onto one or more computing devices and/or computers to cause a series of operational steps to be performed to produce a computer implemented process such that the instructions, when executed, provide steps for implementing the functions specified in the block or blocks.

It will also be understood by those of ordinary skill in the art that modification to and variation of the illustrated embodiments may be made without departing from the inventive concepts described herein.

What is claimed is:

1. A method, comprising:
    collecting user input received by a client device, wherein the client device provides access to a remotely hosted application;
    analyzing, by the client device, the collected user input received by the client device to detect collected user input indicative of machine behavior that simulates inputs provided by a user;
    in response to detection of collected user input received by the client device indicative of machine behavior that simulates inputs provided by a user, displaying, by the client device, at least one verification query in a user interface of the client device;
    receiving, by the client device, at least one answer to the verification query;
    analyzing, by the client device, the answer received to the verification query to determine whether the answer indicates that the user input received by the client device is being provided by a user;
    in response to both i) detection of collected user input received by the client device indicative of machine behavior that simulates inputs provided by a user, and ii) determining that the answer to the verification query indicates that the user input to the client device is being provided by a user, generating, by the client device, a training dataset that indicates that the collected user input received by the client device does not reflect machine behavior; and
    preventing, by the client device, subsequent access to the remotely hosted application through the client device in response to both i) detection of collected user input received by the client device indicative of machine behavior that simulates inputs provided by a user, and ii) determining that the answer received to the verification query indicates that the user input received by the client device is not being provided by a user, in order to protect the remotely hosted application from malicious attacks.

2. The method of claim 1, wherein the client device accesses the remotely hosted application using a client component executing on the client device, and further comprising:
  passing the training dataset from the client device to an offline model training process;
  generating, by the offline model training process, an updated version of a plug-in based on the training dataset; and
  automatically replacing a plug-in that was previously installed in the client component executing in the client device with the updated version of the plug-in.

3. The method of claim 2, further comprising:
  wherein the remotely hosted application executes on a first server computer; and
  wherein the offline model training process executes on a second server computer.

4. The method of claim 3, wherein the client component executing on the client device and used by the client device to access the remotely hosted application comprises a Web browser.

5. The method of claim 3, wherein the user input received by the client device is received by the client component executing on the client device; and
  wherein the plug-in installed in the client component executing on the client device periodically collects the user input received by the client component.

6. The method of claim 5, wherein the plug-in installed in the client component executing on the client device periodically collects user input received by the client component prior to processing of the user input by the client component.

7. The method of claim 5, wherein the plug-in installed in the client component executing on the client device periodically collects user input received by the client component subsequent to processing of the user input and prior to transmission of the user input received by the client component from the client device to the remotely hosted application.

8. The method of claim 5, wherein the user input received by the client component executing on the client device and collected by the plug-in installed in the client component comprises computer mouse input.

9. The method of claim 8, wherein the user input received by the client component executing on the client device and collected by the plug-in installed in the client component further comprises computer keyboard input.

10. The method of claim 5, wherein the plug-in installed in the client component executing on the client device analyzes the collected user input received by the client component, and prevents subsequent access to the hosted application through the client component in response to detection of collected user input received by the client component indicative of machine behavior that simulates inputs provided by a user by suspending execution of the client component on the client device.

11. The method of claim 1, further comprising:
  wherein the client device provides the user with access to a remotely hosted application that comprises a virtual desktop application.

12. The method of claim 1, further comprising:
  wherein the client device provides the user with access to a remotely hosted application that comprises an individual application.

13. A system, comprising:
  a client device that provides access to a remotely hosted application, the client device having processing circuitry and a memory coupled to the processing circuitry wherein the processing circuitry is configured to:
  collect user input received by the client device;
  analyze the collected user input received by the client device to detect collected user input indicative of machine behavior that simulates inputs provided by a user;
  in response to detection of collected user input received by the client device indicative of machine behavior that simulates inputs provided by a user, display, by the client device, at least one verification query in a user interface of the client device;
  receive, by the client device, at least one answer to the verification query;
  analyze, by the client device, the answer received to the verification query to determine whether the answer indicates that the user input received by the client device is being provided by a user;
  in response to both i) detection of collected user input received by the client device indicative of machine behavior that simulates inputs provided by a user, and ii) a determination that the answer to the verification query indicates that the user input to the client device is being provided by a user, generate, by the client device, a training dataset that indicates that the collected user input received by the client device does not reflect machine behavior; and
  prevent subsequent access to the remotely hosted application through the client device in response to both i) detection of collected user input received by the client device indicative of machine behavior that simulates inputs provided by a user, and ii) a determination that the answer received to the verification query indicates that the user input received by the client device is not being provided by a user, in order to protect the remotely hosted application from malicious attacks.

14. A non-transitory computer readable medium storing program code, wherein the program code, when executed by processing circuitry, causes the processing circuitry to perform a method of:
  collecting user input received by a client device, wherein the client device provides access to a remotely hosted application;
  analyzing, by the client device, the collected user input received by the client device to detect collected user input indicative of machine behavior that simulates inputs provided by a user,
  in response to detection of collected user input received by the client device indicative of machine behavior that simulates inputs provided by a user, displaying, by the client device, at least one verification query in a user interface of the client device;
  receiving, by the client device, at least one answer to the verification query;
  analyzing, by the client device, the answer received to the verification query to determine whether the answer indicates that the user input received by the client device is being provided by a user,
  in response to both i) detection of collected user input received by the client device indicative of machine behavior that simulates inputs provided by a user, and ii) determining that the answer to the verification query indicates that the user input to the client device is being provided by a user, generating, by the client device, a training dataset that indicates that the collected user input received by the client device does not reflect machine behavior; and preventing, by the client device, subsequent access to the remotely hosted application through the client device in response to both i) detection of collected user input received by the client device indicative of machine behavior that simulates inputs provided by a user, and ii) determining that the answer received to the verification query indicates that the user input received by the client device is not being provided by a user, in order to protect the remotely hosted application from malicious attacks.

\* \* \* \* \*